United States Patent [19]

Lahti et al.

[11] 3,806,716

[45] Apr. 23, 1974

[54] PARITY ERROR RECOVERY

[75] Inventors: Archie E. Lahti, Minneapolis; George H. Nelson, White Bear Lake, both of Minn.

[73] Assignee: Sperry Rand Corporation, New York, N.Y.

[22] Filed: July 17, 1972

[21] Appl. No.: 272,504

[52] U.S. Cl. .................. 235/153 AC, 235/153 AM, 340/146.1 AG

[51] Int. Cl. ........................ G11c 29/00, G06f 11/04

[58] Field of Search .............. 235/153 AC, 153 AM; 340/146.1 AG; 444/1

[56] References Cited

UNITED STATES PATENTS 3,693,153 9/1972 Rosenfeld ................. 340/146.1 AG

*Primary Examiner*—Felix D. Gruber
*Assistant Examiner*—R. Stephen Dildine, Jr.
*Attorney, Agent, or Firm*—Thomas J. Nikolai; Kenneth T. Grace

[57] ABSTRACT

A comparing means compares the accessed storage address which contains the parity error, with the address of the primary parity error recovery program to determine if they are located in the same storage segment. If coincidence does not exist then the primary parity error recovery program is utilized. If coincidence does exist then an alternate parity error program, which is located in a different storage segment, is utilized.

2 Claims, 4 Drawing Figures

PARITY ERROR RECOVERY

BACKGROUND OF INVENTION

This invention relates generally to a means for recovering from the occurrence of storage parity errors in a data processor system employing a plurality of storage segments and more particularly to a means for recovering from such storage parity errors by providing that the recovery routine is always located in a storage segment different than the storage segment containing the parity error.

In most modern data processing systems, means are provided to check the parity of words stored in memory including, for example, read and write data and address and write controls. When a parity error is determined to be present, appropriate control means call upon a parity error recovery program, which usually is also stored in main storage. More specifically, the detection of a parity error usually results in the generation of an interrupt signal which causes the executive program to refer to a first parity recovery register (PRR) that contains the starting address for a parity recovery program stored in the computer's main memory.

However, a problem can arise when the parity recovery program is stored in the same segment of the memory in which the parity error had occurred. In such an event, the executive program contains an instruction which refers to an alternate parity recovery register (APRR) containing the address of an alternate recovery program stored in a different segment of memory. In prior art systems, the instruction referring to the APRR is obtained from the same storage segment which contained the first parity error recovery program. Under certain conditions, however, such as the presence of a parity error, this storage segment might be disabled. In this event, it would not be possible for the executive program to generate the instruction needed to access the alternate parity recovery register and thereby utilize the alternate parity recovery program.

It is a primary object of the present invention to enable the data processing system to utilize the alternate parity error recovery program even though the storage segment containing the primary parity error recovery program is disconnected from the system.

BRIEF STATEMENT OF THE INVENTION

In accordance with the invention, means are provided for comparing the *N* most significant bits of the primary parity error recovery subroutine address contained in the PRR register with the *N* most significant bits of the storage address being accessed. In each instance two groups of *N* most significant bits sepecify the storage segment containing the parity error recovery program (subroutine) and the storage segment containing the storage address found to have a parity error. Control logic is provided to respond to the lack of coincidence between these two groups of *N* most significant bits, to initiate the parity error program defined by the address in the PRR register. The recovery program, however, resides in a storage segment other than the one containing the storage address being accessed. On the other hand, the presence of coincidence between the aforementioned two groups of *N* most significant bits implies that the storage address being accessed is in the same storage segment as is the parity error recovery program whose address is contained in the PRR register. Accordingly, the control logic is constructed to respond to a determination of coincidence so as to make reference to the alternate PRR register and thereby enable the alternate parity error recovery subroutine rather than the primary subroutine.

Thus, even if the storage segment containing the primary parity error recovery subroutine, designated by the address in the PRR register, is removed from the system, the alternate parity error recovery subroutine will nevertheless become enabled since the comparison of the *N* most significant bits of the PRR register and the *N* most significant bits of the accessed storage address is entirely independent of whether the storage segment containing the primary recovery subroutine is or is not in the system.

BRIEF DESCRIPTION OF THE DRAWINGS

The above mentioned and other objects and features of the invention will be more fully understood from the following detailed description thereof when read in conjunction with the drawings in which.

DESCRIPTION OF THE INVENTION

Figure 1:
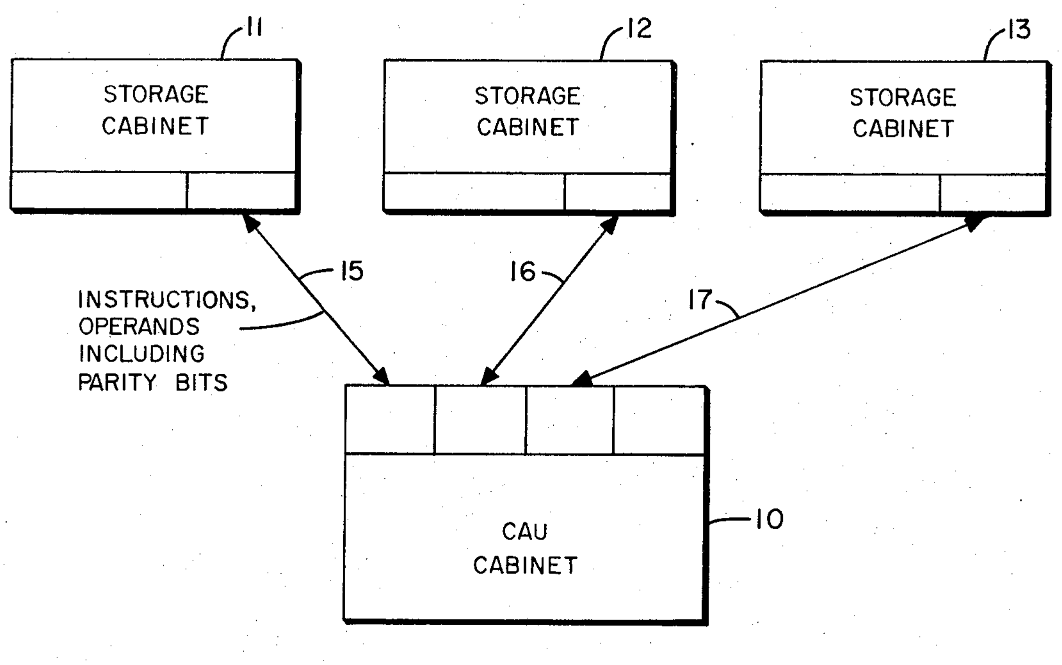
FIG. 1 shows a generalized block diagram of the relation between the several storage segments of a data processor and the command arithmetic unit which interfaces with said storage segments.

Referring now to FIG. 1 there is shown a portion of a data processor system including three storage segments designated generally by blocks 11, 12 and 13, which are connected to a command arithmetic unit (CAU) 10 through connecting means 15, 16 and 17, respectively.

Over each of the connecting means 15, 16 and 17 there are transmitted instructions, operands and parity bits. The instructions include read and write instruction, addressing instructions and various control instructions. The CAU 10 contains a plurality of flip-flop registers including the PRR register and the APRR register.

Under the direction of the executive program the primary parity error recovery program can be assigned to, i.e., located within any of the storage segments 11, 12 or 13. The starting address for such primary parity error recovery program is then stored in the PRR register 18 (FIG. 1A) located in CAU 10. The starting address for the parity error recovery subroutine may be referred to as the interrupt address since it comes into play upon the generation of an interrupt signal when a parity error is detected. For purposes of discussion let it be assumed that the primary parity recovery subroutine is stored in memory segment 11.

In accordance with the teachings of this invention, an alternate parity error recovery program is also stored in one of the remaining storage segments 12 or 13. The interrupt address for the alternate recovery program is then stored in the alternate parity recovery register 19 shown in FIG. 1A which is also contained in the CAU cabinet 10. It is to be noted that the alternate recovery subroutine is stored in a memory segment different from the is stored segment in which is stored the primary parity error recovery subroutine is stored.

For purposes of discussion the PRR and APRR registers are adapted to contain 24 bits in length. Bits 15 – 23 in both registers point to an address in a table of interrupts which includes, among other interrupts, the parity storage recovery program interrupt.

Figure 1A:
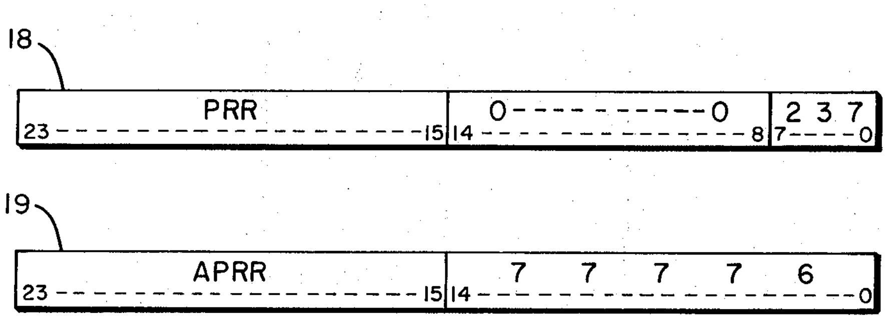
FIG. 1A shows the format of the address words which point to the parity error recovery programs and which are contained in the parity error recovery register and the alternate parity error recovery register.

The bits 0 – 7 in the PRR register 18 in FIG. 1A are assumed to specifically identify the parity error interrupt address in the table of interrupts, which is, in fact, the first instruction of the primary parity error recovery program. Similarly the group of bits 0 – 14 in the APRR register 19 of FIG. 1A are assumed to define a particular address in the table of interrupts, which address contains the first word of the alternate parity error recovery program.

Figure 2:
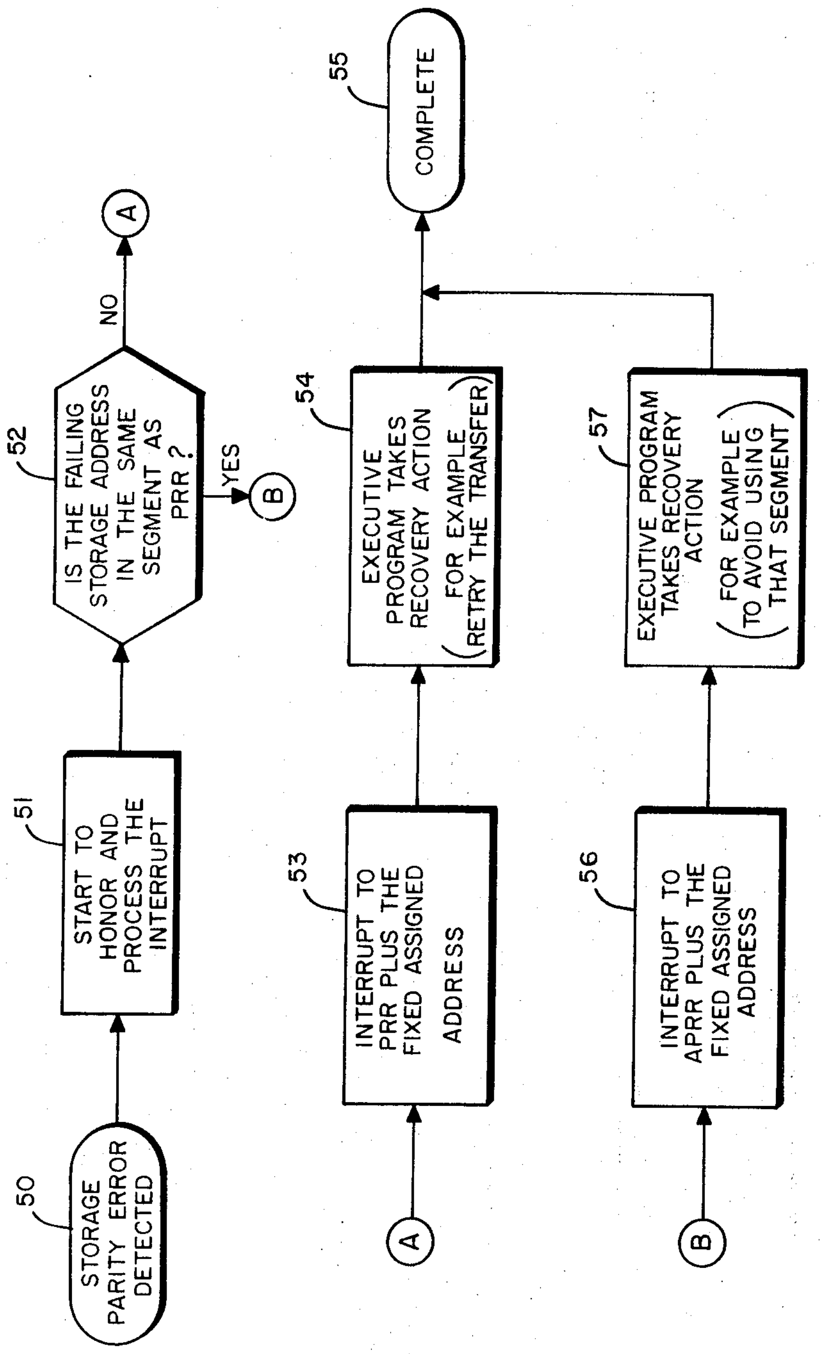
FIG. 2 is a flow diagram of the operation of the logic.

In FIG. 2 there is shown a general logic flow diagram of the operation of the invention. In FIG. 2 the block 50 indicates the detection of the storage parity error. Subsequent to such detection the system will initiate honoring and processing of the parity error interrupt signal as indicated in block 51.

Next, a determination must be made as to whether the failing storage address is in the same storage segment as is the primary parity recovery subroutine. Such determination is made by appropriate logic as indicated in block 52. If the failing storage address is not in the same storage segment as is the parity error recovery subroutine then the output of decision block 22 is a NO and the logic flow proceeds to block 53 in FIG. 2. In block 53 the operation of the system is interrupted to the PRR register which contains the address of the first word of the primary parity error recovery subroutine. The executive program then takes the appropriate recovery action as indicated in block 54 and in accordance with the parity error recovery program defined by the address in the PRR register.

Upon completion of the parity error recovery program as indicated by block 55 the system will take whatever action is necessary to enable it to return to the program which was interrupted upon the detection of the parity error.

Returning again to the decision block 52 in FIG. 2, if the failing storage address is located in the same storage segment as is the address contained in the PRR register then the logic flow jumps to block 56. As indicated in block 26 the processor is interrupted to the alternate PRR register which contains the address of the first instruction of the alternate parity error recovery circuit which, by definition, is located in the storage segment other than the storage segment in which the failing storage address is located.

The executive program then takes the proper recovery action as shown in block 57 and in accordance with the alternate parity recovery circuit. Upon completion of such recovery parity error recovery subroutine the processor returns to normal operation.

Figure 3:
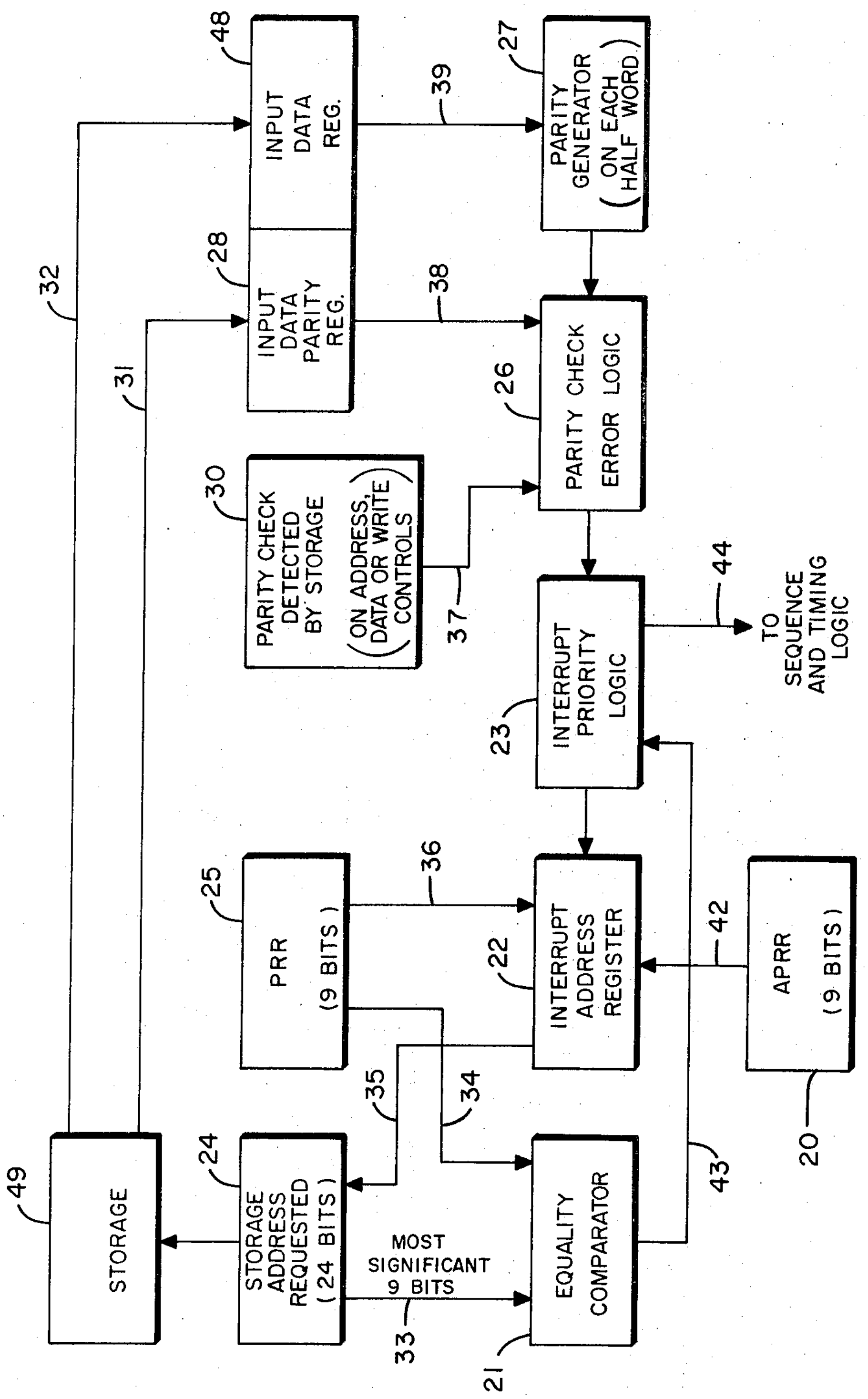
FIG. 3 is a logic diagram of the invention.

Referring now to FIG. 3 the memory 49 comprises several storage segments. A request to access a given storage address in one of the storage segments in memory 49 is made by the logic 24. The accessed storage word from memory 49 is supplied back to an input data register 48 via leads 32. Two parity bits are also supplied from storage through leads 31 to an input data parity register 28.

A parity generator logic 27 examines the received data word stored in register 48 and generates a parity bit which is supplied to the parity check error logic 26. Also supplied to said parity check error 26 are the two parity bits stored in the input data parity register 28.

The parity check logic 26 responds to the outputs from input data parity register 28 and parity generator 27 to determine if a parity error exists in the data word received from storage 49.

A second type parity check is made within the logic block 30. More specifically, the logic within block 30 checks for parity errors in the read or write data supplied to storage 49 and for parity errors in the addressing or other control words supplied to storage 49. The logic within block 30 is conventionally regarded as a part of the storage logic.

The output from logic 30 is supplied to the parity check error logic 26 which determines if a parity error is present. Thus, if there is a parity error either in the data word supplied from storage, or in the read or write instructions, or in other control words, the parity check error logic 26 will detect such error and supply an output to the interrupt priority logic 23. The logic 23 will then supply a signal to the sequence and timing logic 44 which will initiate the parity check interruption routine.

As mentioned above the output signal of the equality comparator 21 indicates the address of the primary parity error routine, which is contained in the PRR register, is stored in the same storage segment containing the accessed storage address. Such equality is determined by comparing the *N* most significant bits of the address stored in the PRR with the *N* most significant bits of the storage segment containing the accessed storage word. The output signal of said equality comparator 21 is supplied to the interrupt priority logic 23.

If such coincidence does not exist then the interrupt priority logic 23 will function to transfer the contents of the PRR register 25 into the interrupt address register 22 and will also function to add the pointer address in the PRR register to the index value contained therein, thereby computing the absolute address of the primary parity error recovery routine.

On the other hand if equality does exist between the N most significant bits of blocks 24 and 25 then the interrupt priority logic will respond to the output of the equality comparator 21 to cause the contents of the APRR register 20 to be transferred to the interrupt address register 22. As in the case of the transfer of the contents of the PRR register 25 the pointer portion of the address in APRR 20 is added to the index value contained therein to arrive at the absolute address of the alternate parity error recovery routine.

The parity error recovery program address stored in the register 22, whether it be the primary or the alternate recovery program, is supplied through the storage address requested logic 24 to main storage 49 to initiate execution of theparity error recovery subroutine.

It is to be understood that the form of the invention shown and described herein is but a preferred embodiment thereof and that various changes can be made in the logic arrangement without departing from the spirit or the scope thereof.

What is claimed is:

1. In a data processing system of the type including a digital computer having a plurality of storage segments each having independent accessing means, a means for always selecting a parity error recovery routine which is stored in a storage segment other than the storage segment in which the accessed storage address is contained, and comprising:

first register means in said computer for containing the starting address of a first parity error recovery routine stored in a first storage segment;

second register means in said computer for containing the starting address of a second parity error recovery routine stored in a second storage segment different from said first storage segment;

comparing means connected to said first register means and said accessing means for determining coincidence or lack of coincidence between the *N* most significant bits of said starting address of said first parity error recovery routine with the *N* most significant bits of an accessed storage address, where *N* is the number of bits required to distinguish among the said plurality of storage segments;

parity check means for producing a parity error signal when a parity error has occurred in the accessing of said accessed storage address;

control means responsive to said parity error signal and to a determination of lack of coincidence by said comparing means to interrupt the operation of said computer to the contents of said first register means to initiate execution of the said first parity error recovery routine;

said control means further responsive to a determination of coincidence by said comparator means to interrupt the operation of said computer to the contents of said second register means to initiate execution of said second parity error recovery routine.

2. In a data processor system of the type including a digital computer having a plurality of independently accessible storage segments, selecting means for always selecting a storage segment parity error recovery subroutine which is located in a storage segment other than the storage segment containing the parity error, and comprising;:

first and second pointing means for pointing to first and second parity error recovery programs located in first and second storage segments, respectively;

means for determining that a parity error has occurred in the accessing of a given storage address located in a given storage segment;

comparing means for determining whether said given storage address is located in said first storage segment;

control means responsive to said comparing means and said parity error determining means for interrupting the normal operating sequence of said computer to a first new sequence determined by said first pointing means when said given storage address is not located in said first storage means and to a second new sequence determined by said second pointing means when said given storage address is located in said first storage segment.

* * * * *